United States Patent [19]

Keehn

[11] Patent Number: 5,421,683

[45] Date of Patent: Jun. 6, 1995

[54] MACHINE TOOL WITH TEMPERATURE COMPENSATION

[75] Inventor: Richard G. Keehn, Rochester Hills, Mich.

[73] Assignee: National Broach & Machine Company, Mt. Clemens, Mich.

[21] Appl. No.: 77,655

[22] Filed: Jun. 17, 1993

[51] Int. Cl.$^6$ .......................................... B23Q 15/18
[52] U.S. Cl. .................................... 409/136; 408/56; 83/74; 83/76.7
[58] Field of Search ................... 409/37, 49, 131, 135, 409/136; 408/56, 61; 83/13, 15, 22, 72, 73, 74, 169, 76.7, 861; 82/900

[56] References Cited

U.S. PATENT DOCUMENTS

| | | | |
|---|---|---|---|
| 3,521,526 | 7/1970 | Olig et al. | 409/135 |
| 4,530,626 | 7/1985 | Sabbioni | 409/135 X |
| 4,533,858 | 8/1985 | Tlaker | 82/900 X |
| 4,619,565 | 10/1986 | Schmid et al. | 409/135 |
| 4,714,387 | 12/1987 | Ohno | 409/136 X |

FOREIGN PATENT DOCUMENTS

| | | | |
|---|---|---|---|
| 0114838 | 7/1983 | Japan | 409/135 |
| 0132441 | 8/1983 | Japan | 409/135 |
| 0020840 | 2/1985 | Japan | 409/135 |

Primary Examiner—Eugenia Jones
Attorney, Agent, or Firm—Barnes, Kisselle, Raisch, Choate, Whittemore & Hulbert

[57] ABSTRACT

A machine has a cutter for performing a cutting operation on a series of workpieces. The cutter is moved toward the workpiece to perform the cutting operation, and a control regulates the amount of such movement to an infeed distance for effecting a predetermined depth of cut. The control is adjusted in response to temperature changes which result in machine growth/shrinkage in order to vary the infeed distance as required to maintain the depth of cut constant despite the machine growth/shrinkage.

2 Claims, 3 Drawing Sheets

MACHINE TOOL WITH TEMPERATURE COMPENSATION

This invention relates generally to a machine tool for cutting a series of workpieces, and refers more particularly to a means for compensating for machine tool growth/shrinkage so that the depth of cut on successive workpieces is substantially uniform.

BACKGROUND

Although this invention can be used in many metal cutting processes, it is particularly useful in gear shaving. In gear shaving, the distance between the centerlines of the cutter and the workpiece is reduced by either feeding the workpiece into the cutter or feeding the cutter into the workpiece. This distance is called the center distance.

Before shaving production gears to a specific size, the finished size shaving center distance (Csh) must be determined. This value is the smallest distance between the centerlines of the shaving cutter and the workpiece used to produce the workpiece to finished size.

The first step in determining (Csh) is to either calculate or experimentally measure a test center distance (Ct). A theoretical value for (Ct) may be calculated by using gear and tool geometry information. Alternatively, an experienced machine operator can find (Ct) experimentally by bringing the shaving cutter and workpiece into mesh and rotating them while adjusting (Ct) until the correct amount of backlash is observed. Once (Ct) is determined, a test workpiece is shaved and measured for size. If the workpiece is within the acceptable size tolerance, it is kept and (Csh) is set to equal (Ct). Otherwise the workpiece is scrapped, (Ct) is adjusted and another test workpiece is shaved.

Theoretically, it should be possible to use the shaving center distance (Csh) to consistently shave workpieces to the correct size. However, in practice, this is seldom the case. Typically, workpiece size will gradually become smaller as repeated workpieces are shaved. In addition, the first workpiece shaved per shift will vary in size from day to day. These observed changes in workpiece size are the result of thermal instability of the machine. In other words, as the machine heats up or cools down the actual center distance that the workpiece is shaved to varies because heat causes parts of the machine to expand and contract. This growth and shrinkage if left unchecked is usually significant enough to cause the workpiece to fail the size tolerance test over time. Therefore some type of size compensation is usually administered.

One way to try to avoid workpiece size inconsistency is to control the temperature of the work environment. Controlling the coolant temperature has been employed, but this method does not account for all of the thermal factors.

SUMMARY OF THE INVENTION

The three main causes of gear shaving machine thermal growth/shrinkage are 1) heating of the reciprocating spindle (shaving cutter), 2) coolant heating, and 3) ambient (room) temperature fluctuations. Therefore, instead of trying to cool the thermal environment for all thermal factors, it has been discovered that the shaving machine may be allowed to expand/contract with changes in temperature and the shaving center distance altered to compensate for size error caused by temperature variance. This adjusted shaving center distance (Cadj) is then a function of (Csh) and measured temperature fluctuation.

In accordance with the present invention, after the shaving center distance (Csh) is determined, the adjusted shaving center distance (Cadj) is calculated as a function of the measured temperature. For this purpose, the ambient (room) temperature is monitored, as is temperature of the coolant and the reciprocating tool spindle. This monitoring continues throughout the cutting of a series of workpieces and adjustment of the shaving center distance is made so that all workpieces will be cut to the desired size.

One object of this invention is to provide a machine having the foregoing features.

Another object is to provide a machine with means to compensate for machine growth/shrinkage which is rugged and durable in operation, composed of a relatively few simple parts, effective in use, and easy to operate.

These and other objects, features and advantages of the invention will become more apparent as the following description proceeds, especially when taken with the accompanying drawings.

DETAILED DESCRIPTION

Figure 1:
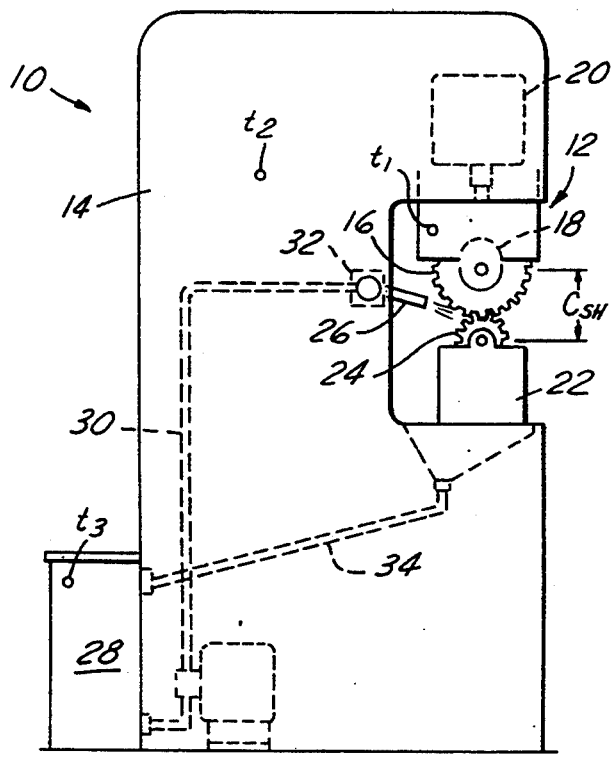
FIG. 1 is a semi-diagrammatic side elevational view of a machine tool incorporating the invention.

Referring now more particularly to the drawings, FIG. 1 illustrates a gear shaving machine 10. A spindle assembly 12 is mounted on the machine frame 14 for vertical sliding movement. The spindle assembly supports a cutting tool 16 for axial rotation about a generally horizontal axis. The cutting tool is only diagrammatically shown but in this instance is a gashed rotary cutter in the form of a helical gear. The gear is rotated by a motor 18. The spindle assembly is moved up and down by a motor and ball screw drive 20.

A table 22 is supported on the machine frame beneath the spindle assembly 12. The table supports a workpiece 24 for axial rotation about a generally horizontal axis. The workpiece in this instance is a gear.

The cutter and workpiece are bathed with a liquid coolant from nozzle 26. The coolant is drawn from reservoir 28 and delivered through line 30 by pump 32, and is returned to the reservoir by line 34 for recirculation.

Gear shaving is a free-cutting gear finishing operation which removes small amounts of metal from the working surfaces of the gear teeth. Its purpose is to correct errors in index, helix angle, tooth profile and eccentricity—also to improve tooth surface smoothness and to eliminate the danger of tooth end load concentrations in service. It also increases the load-carrying capacity of the gear, its factor of safety and its service life.

The gear shaving process consists of the use of a gashed rotary cutter in the form of a helical gear—a gear having a helical angle different from that of the workpiece (gear) to be shaved—and crossing the axes of the cutter and the workpiece at a predetermined angle during the shaving operation. When the cutter and workpiece are rotated in close mesh, the edge of each cutter gash as it moves over the surface of a workpiece shaves a fine hairlike chip, somewhat like that produced by a diamond boring tool.

This process is carried out by the machine in FIG. 1. The cutter 16 is driven by motor 18. The work table may optionally be reciprocable. The workpiece 24 is carried between live centers and is driven by the cutter. During the shaving cycle and while the workpiece is driven by the cutter, the distance between the centerlines of the cutter and workpiece is reduced by feeding the cutter into the workpiece. Alternatively, the workpiece could be fed into the cutter. The final infeed distance is called the center distance.

Figure 2:
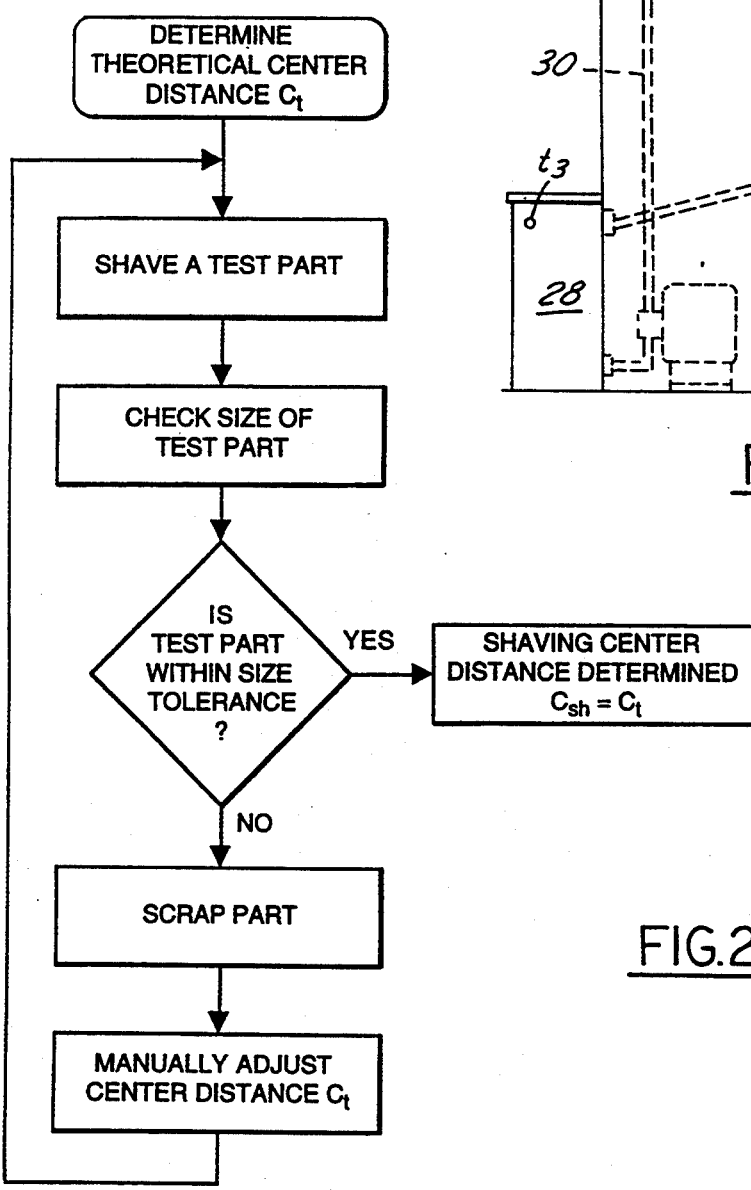
FIG. 2 is a flow diagram showing the method of determining the shaving center distance (Csh).

As stated above, before shaving production gears to a predetermined size, the finished size shaving center distance (Csh) is determined. Referring to FIG. 2, the test center distance (Ct) is first calculated using gear and tool geometry information. This distance (Ct) may also be determined experimentally by an operator. A test workpiece is then shaved to the test center distance (Ct). If the workpiece is within acceptable size tolerance, it is kept and (Csh) is set to equal (Ct). If not, the workpiece is scrapped, (Ct) is adjusted and another test workpiece is shaved. The process according to the flow chart in FIG. 2 is followed until (Csh) is determined.

As also stated above, as successive workpieces are cut or shaved, the machine often heats up or cools down so that the actual center distance to which the workpiece is shaved will vary even though the closed loop positioning system is commanded to move to the shaving center distance (Csh) because heat causes parts of the machine to expand and contract. This invention compensates for machine growth/shrinkage so that all parts are cut to substantially uniform size by introducing an adjusted shaving center distance (Cadj).

Figure 3:
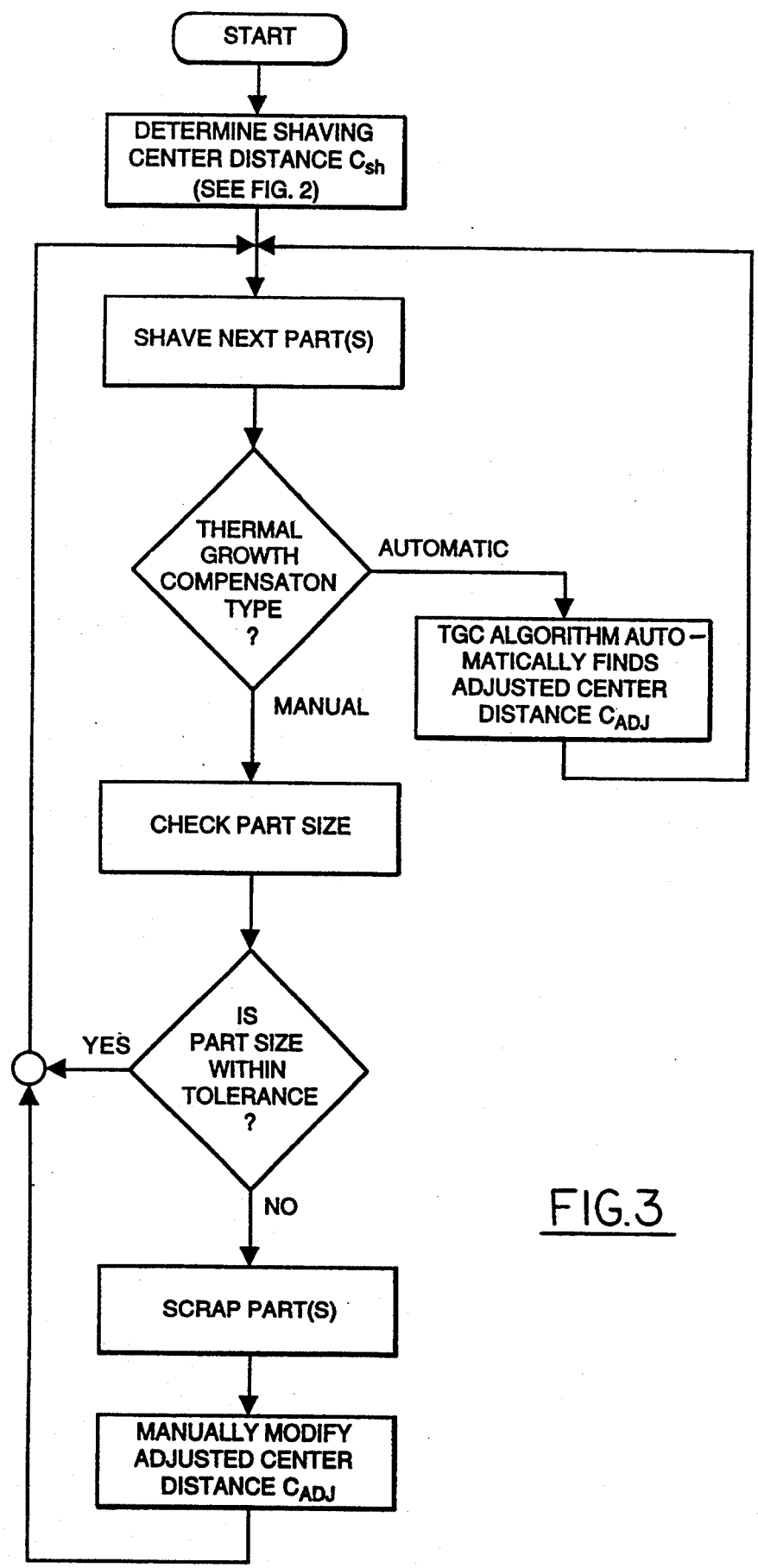
FIG. 3 is a flow diagram showing the manner in which dynamic adjustment of the shaving center distance (Cadj) is determined.

FIG. 3 shows how the adjusted shaving center distance (Cadj) can be determined either manually or automatically. After the shaving center distance (Csh) is determined according to FIG. 2, a workpiece is shaved to (Csh). If the manual method is used, the cut part is checked for size and if within tolerance, the next part is cut to the same size, and so on. If the cut part is not within tolerance, it is scrapped, the adjusted center distance (Cadj) is modified and another part is cut.

If the automatic method is employed, a computer C calculates the adjusted center distance (Cadj) as a function of the measured temperature using an automatic thermal growth/shrinkage size compensation algorithm. The temperature is measured by three temperature sensors $t_1$, $t_2$ and $t_3$. Sensor $t_1$ senses the temperature of the spindle assembly 12, sensor $t_2$ senses the ambient (room) temperature, and sensor $t_3$ senses the temperature of the recirculated coolant in reservoir 28. The adjusted center distance (Cadj) calculated by the computer is then used for the infeed of the spindle assembly 12 in the shaving of the next workpiece. The temperatures are continuously monitored and the adjusted center distance recalculated so that all parts are cut to the same size.

Figure 4:
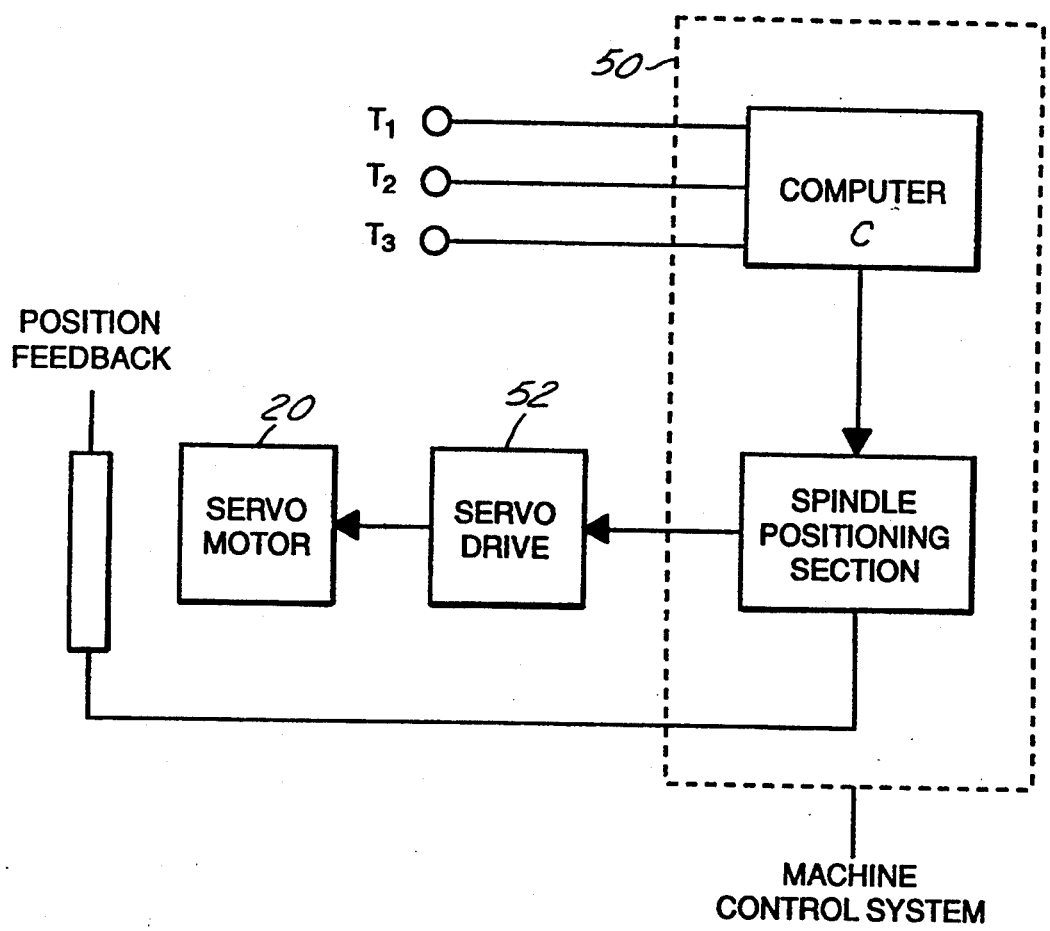
FIG. 4 is a schematic showing the hardware involved in the automatic thermal growth size compensation.

FIG. 4 shows the computer C as part of a machine control system 50 which includes also a spindle positioning section. As there seen, the temperature sensors $t_1$, $t_2$, $t_3$ feed monitored temperatures to the computer C which calculates the adjusted center distance (Cadj) as described, and this information is transmitted to and commands the spindle positioning section 50 accordingly, operating the servo drive 52 to cause the servo motor and ball screw drive 20 to infeed the cutter an adjusted center distance (Cadj) and cut the part to the desired size. FIG. 4 also shows the position feedback device for feeding back to the spindle positioning section the actual infeed travel of the cutter.

Figure 5:
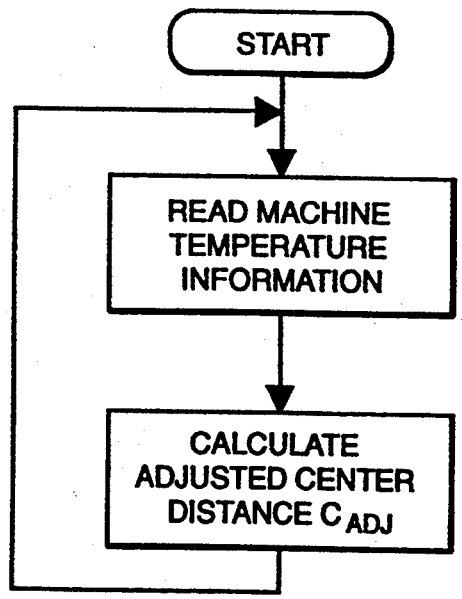
FIG. 5 is a flow diagram showing the automatic calculation of adjusted shaving center distance (Cadj).

FIG. 5 shows the automatic calculation of the adjusted shaving distance (Cadj) in which the computer reads the temperature information from the sensors and makes the calculation.

The process of monitoring temperature and calculating the adjusted center distance (Cadj) is carried out repeatedly and continuously during the cutting of a series of workpieces to keep the workpieces within size despite temperature changes.

What is claimed is:

1. In a machine for performing a cutting operation on a series of workpieces:
    a spindle assembly,
    a cutter mounted on said spindle assembly,
    feed means for relatively moving said spindle assembly and a workpiece toward one another an in-feed distance to cause said cutter to take a predetermined depth of cut on the workpiece in said cutting operation,
    means for supplying liquid coolant to the cutter and workpiece during the cutting operation,
    a first temperature sensor for sensing the temperature of the spindle assembly,
    a second temperature sensor for sensing the temperature of the liquid coolant,
    a third temperature sensor for sensing the ambient room temperature,
    a computer,
    means for transmitting the temperatures sensed by said first, second and third temperature sensors to said computer,
    said computer being operative to calculate an adjusted in-feed distance based on the temperatures transmitted to said computer,
    and control means operated by said computer for regulating the amount of such relative movement by said feed means to the adjusted in-feed distance calculated by said computer in order to effect said predetermined depth of cut despite machine tool growth/shrinkage as a result of temperature changes.

2. In a machine according to claim 1, wherein said first, second and third temperature sensors are operative to continuously sense temperatures and said computer is operative to recalculate an adjusted in-feed distance based on any temperature changes transmitted thereto by said temperature sensors.

* * * * *